United States Patent
Bloemker

(10) Patent No.: US 9,573,009 B2
(45) Date of Patent: Feb. 21, 2017

(54) FIREFIGHTING TRAINING UNIT

(71) Applicant: Shawn C. Bloemker, Godfrey, IL (US)

(72) Inventor: Shawn C. Bloemker, Godfrey, IL (US)

(73) Assignee: Max Fire Training, Inc., Godfrey, IL (US)

( * ) Notice: Subject to any disclaimer, the term of this patent is extended or adjusted under 35 U.S.C. 154(b) by 0 days.

(21) Appl. No.: 14/752,064

(22) Filed: Jun. 26, 2015

(65) Prior Publication Data
US 2016/0293023 A1   Oct. 6, 2016

Related U.S. Application Data

(63) Continuation-in-part of application No. 14/161,074, filed on Jan. 22, 2014.

(51) Int. Cl.
*A62C 99/00*   (2010.01)
*G09B 19/00*   (2006.01)

(52) U.S. Cl.
CPC ........... *A62C 99/0081* (2013.01); *G09B 19/00* (2013.01)

(58) Field of Classification Search
CPC ............................ G09B 19/00; A62C 99/0081
USPC ........................................................ 434/226
See application file for complete search history.

(56) References Cited

U.S. PATENT DOCUMENTS

| | | | |
|---|---|---|---|
| 1,469,070 A * | 9/1923 | Jacobs | A47J 27/0811 292/256.75 |
| 2,118,338 A | 5/1938 | Bolhuis | |
| 2,635,359 A | 4/1953 | Broscious | |
| 5,167,560 A | 12/1992 | Lubiniecki | |
| 5,203,707 A | 4/1993 | Musto et al. | |
| 5,927,990 A | 7/1999 | Welch et al. | |
| 6,179,620 B1 | 1/2001 | Schmid | |
| 6,524,107 B1 | 2/2003 | Brown | |
| 6,889,473 B2 | 5/2005 | Westra | |
| 7,074,043 B1 | 7/2006 | Jacobson | |
| 7,493,731 B2 | 2/2009 | Zhang | |
| 7,823,357 B2 | 11/2010 | Westra | |
| 8,048,505 B1 | 11/2011 | Reaney | |
| 2008/0029527 A1 * | 2/2008 | Woinarski | B65D 43/0256 220/782 |

(Continued)

FOREIGN PATENT DOCUMENTS

| | | |
|---|---|---|
| GB | 2294572 A | 5/1996 |
| GB | 2339955 A | 2/2000 |
| NL | 1003574 | 6/1997 |

OTHER PUBLICATIONS

"Live Fire Training Fatalities," Ed Hartin, http://web.archive.org/web/20101022052629/http://cfbt-us.com/wordpress/?tag=add-new-tag, Oct. 22, 2010.*

(Continued)

*Primary Examiner* — Andrew Iwamaye
*Assistant Examiner* — Jennifer L Korb
(74) *Attorney, Agent, or Firm* — Grace J. Fishel

(57) ABSTRACT

A metal container with a combustible liner for use as a portable firefighting training unit. The combustible liner is formed of particle board sections loosely assembled inside the metal container with an opening in the liner in registry with an access opening in the metal container. The unit may be used to demonstrate various phenomena associated with a developing fire including the flammability of unburned products of combustion, hose stream techniques with a spray bottle filled with water, flashover and backdraft.

13 Claims, 5 Drawing Sheets

(56) References Cited

U.S. PATENT DOCUMENTS

| | | | |
|---|---|---|---|
| 2008/0239638 A1* | 10/2008 | Chinuki | F16M 11/28 |
| | | | 361/679.07 |
| 2009/0159592 A1* | 6/2009 | Vitalis | B65D 88/125 |
| | | | 220/1.5 |
| 2009/0188188 A1 | 7/2009 | Rivet | |
| 2013/0224005 A1* | 8/2013 | Casavant | F01D 25/243 |
| | | | 415/200 |

OTHER PUBLICATIONS

"Burning Down the (Dolls) House: Small Scale Compartment Fire Demonstrations," CFBT, http://web.archive.org/web/20110924231620/http://www.cfbt-us.com/pdfs/revised_dh_plans_v3.pdf, Sep. 24, 2011.*
"PPE in Flashover Simulators and Burn Buildings," Jeffrey O. and Grace G. Stull, https://www.firerecruit.com/articles/897721-PPE-in-flashover-simulators-and-burn-buildings, Oct. 21, 2010.*
International Search Report and Written Opinion of the International Searching Authoriy in co-pending International application No. PCT/US2015/012374 filed Jan. 22, 2015.
Translation of NL 1003574.
http://www.cfbt-us.com/pdfs/revised_dh_plans_v3.pdf Copyright unknown but admitted prior art.

* cited by examiner

FIREFIGHTING TRAINING UNIT

BACKGROUND OF THE INVENTION

1. Field of the Invention

The present invention relates to a portable firefighting training unit which can be used to demonstrate the progression of a fire including flashovers and backdrafts.

2. Brief Description of the Prior Art

The hazards of flashover, backdraft, smoke explosion and other forms of fire gas ignition need to be taught to firefighters. For this purpose steel shipping containers are frequently used to provide firefighters with the necessary understanding of fire behavior. In use, the container is loaded at one end with Class A combustibles with open and shut vents added to control air flow. Inside these cells, the firefighters may view the early stages of fire growth and examine first hand the production of unburned products of combustion combining with flammable gases given off by the pyrolyzing combustibles. They may witness the transformation of smoke to flame as pockets of unburned fuel in the smoke reach ignition and turn to flame. As the demonstration progresses, the firefighters may observe a flashover in the fuel-loaded end of the cell, witnessing the sudden but sustained transition from a developing to a fully developed fire. Variations on the shipping container have been designed, some of which are patented, and are used to demonstrate door entry techniques and backdraft.

The above mentioned equipment is very effective at training but is not available for training all firefighters including those belonging to volunteer departments because of cost, time and/or logistics. According to the National Fire Protection Association's U.S. fire department profile, about 70% of all firefighters in America are volunteers and the majority of career and volunteer fire departments having a limited training budget. Hence the number of firefighters possibly in need of training is not insignificant.

There are field training programs for firefighters and one of the pieces of equipment used for field training is what is called a "dolls house." The components of the "dolls house" are cut from particle board and then glued or stapled together. The joints must be tight as the purpose of the prop is to simulate a single compartment fire with a single ventilation point. Making the dolls house is tedious and a new one must be constructed for each demonstration as it is burned. It would therefore be desirable to have a burnable teaching prop that is portable for field use but that does not need to stapled or glued together and is not expensive.

BRIEF SUMMARY OF THE INVENTION

In view of the above, it is an object of the present invention to provide a small scale firefighting training unit that is easy to assemble. It is another object to provide a training unit that is small enough that it can be carried by an instructor for field training of firefighters. Another object is to provide a training unit that is relatively inexpensive and therefore available for training firefighters belonging to career and volunteer departments. Other objects and features of the invention will be in part apparent and in part pointed out hereinafter.

A portable firefighting training unit in accordance with the present invention includes a metal container with a combustible liner. The metal container has an outer wall, a bottom wall and a lid. The outer wall has a top edge and a bottom edge, with the bottom wall joined to the outer wall near the bottom edge of the outer wall to define an open cavity. An access opening is provided in the outer wall along the bottom wall and a peripheral flange is provided below the top edge above the access opening to direct smoke. In an embodiment, the lid is mounted on the outer wall opposite the access opening for movement relative to the top edge of outer wall.

The combustible liner is formed from a plurality of side panels, a bottom panel and a top panel. The bottom panel is fitted inside the outer wall of the metal container resting on the bottom wall of the metal container. The side panels have an upper edge and a lower edge with the lower edge of the side panels resting on the bottom panel. The side panels are loosely butted together against the outer wall of the metal container and one of said side panels has an opening in registry with the access opening in the outer wall of the metal container. The upper edge of the side panels support the top panel such that a top surface of the top panel is slightly proud of the top edge of the outer wall.

A swing-bolt or other quick-releasable fastening means is used to secure the lid in closed position with the lid exerting a sealing pressure on the top panel forming a gasket blocking the passage of air into the combustible liner other than through the access opening. In some embodiments the metal container is cuboidal and formed of sheet steel and the liner is formed of particle board and a cover is provided for blocking the air pathway through the access opening. Other embodiments include a mast by which the metal container may be mounted on a mobilizer carriage. Still further embodiments include additional access openings to simulate a window or a roof vent.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
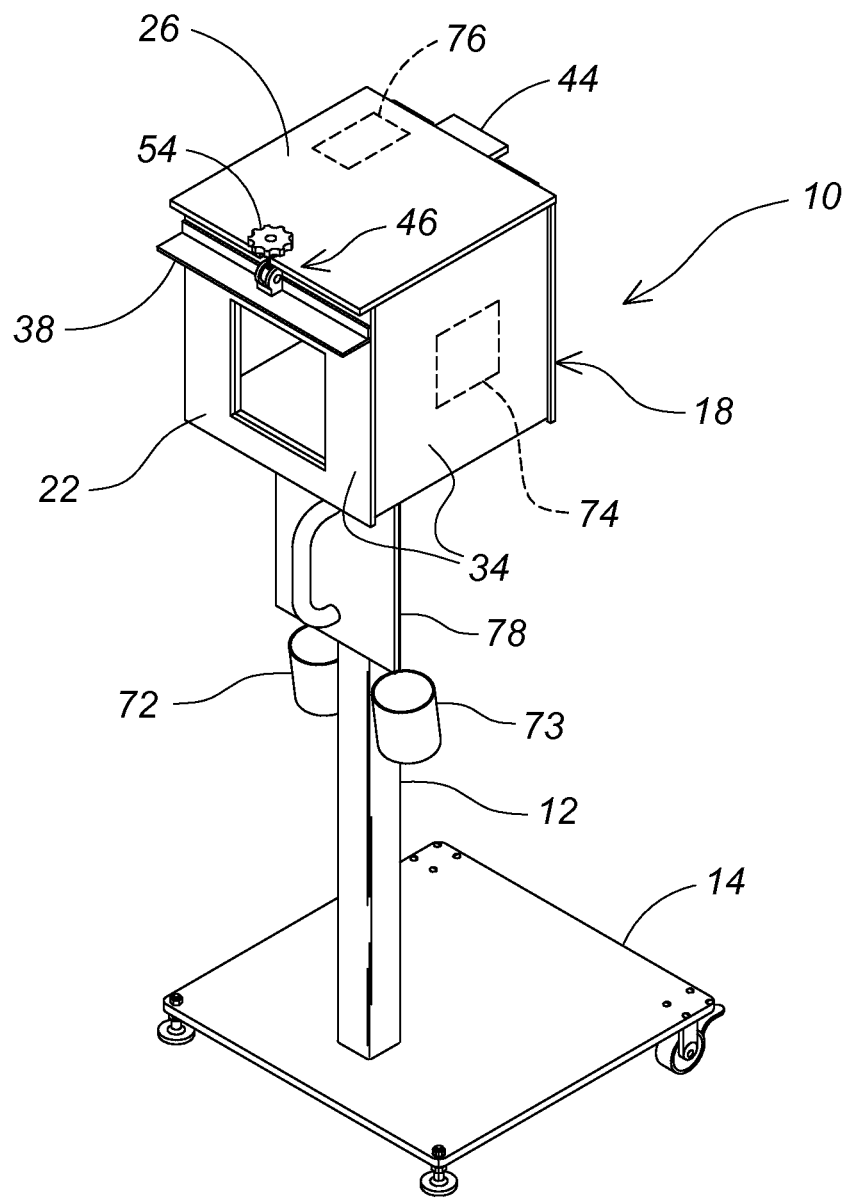
FIG. 1 is a perspective view of a portable firefighting training unit including a metal container with a combustible liner mounted on a mast and a mobilizer carriage.
Figure 2:
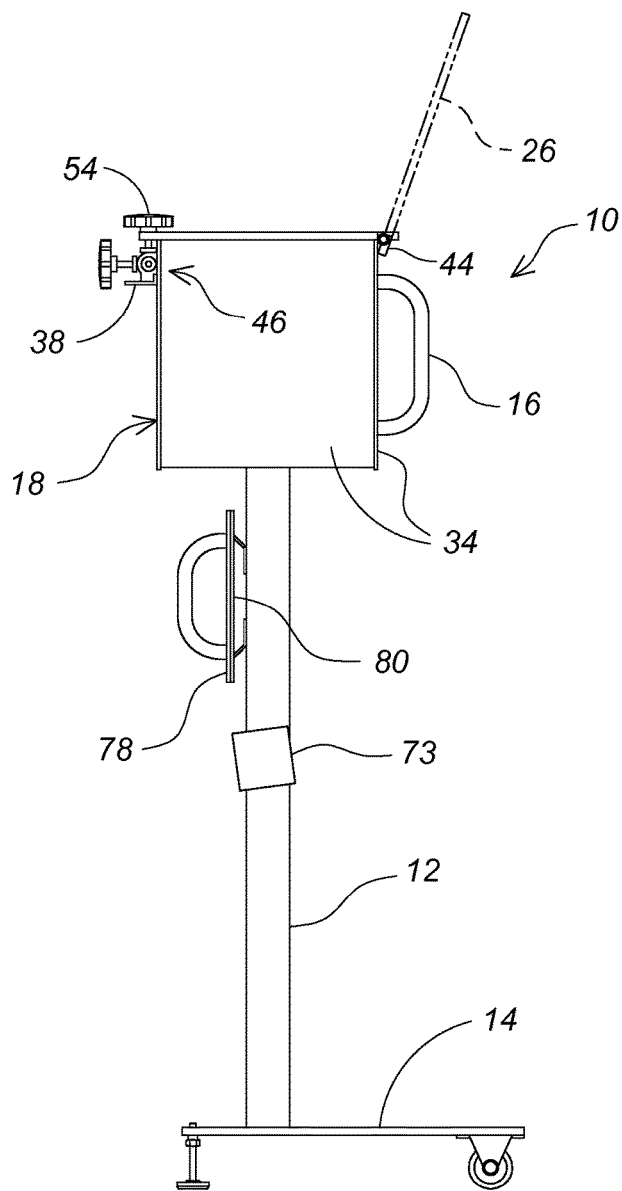
FIG. 2 is a side elevation of the unit mounted as shown in FIG. 1.
Figure 3:
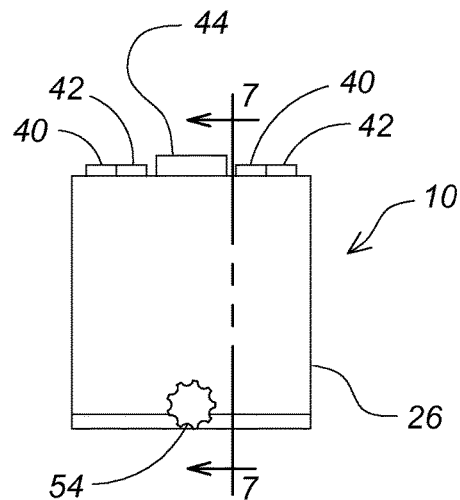
FIG. 3 is a top view of the metal container.

Referring to the drawings more particularly by reference character, reference numeral 10 refers to a portable, small scale firefighting training unit in accordance with the present invention. As shown in FIGS. 1 and 2, unit 10 is mounted on a mast 12 supported on a mobilizer carriage 14 to allow unit 10 to be easily transported. A handle 16 may be provided on unit 10 for use in rolling the mounted unit about on mobilizer carriage 14 to a demonstration area.

Figure 7:
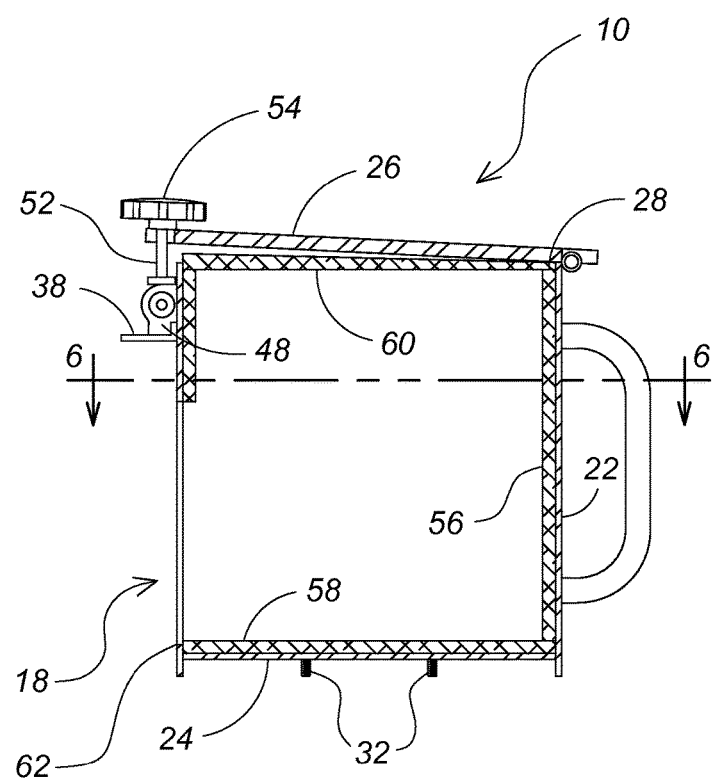
FIG. 7 is a cross-section taken along the plane of 7-7 in FIG. 3; and, FIGS. 8A through 8D demonstrate various phenomena associated with a developing fire in the training unit.

In major part, unit 10 includes a metal container 18 and a combustible liner 20. While metal container 18 is illustrated as a one-compartment simulator, it will be understood that multiple units may be constructed with compartments horizontally linked or stacked vertically. As best seen in FIG. 7, metal container 18 has an outer wall 22, a bottom wall 24 and a lid 26; formed of sheet steel or the like. Outer wall 22 has a top edge 28 with a bottom edge 30. With continuing reference to FIG. 7, bottom wall 24 may be joined as by welding to outer wall 22 and includes threaded fasteners 32 for attachment to mast 12. Outer wall 22 is formed in sections 34 (FIG. 5) which are welded together and has an access opening 36 along bottom wall 24 to simulate a doorway. Outer wall 22 also has a peripheral flange 38 spaced below top edge 28 above access opening 36. Lid 26 is generally constructed and arranged to cooperate with outer wall 22 and bottom wall 24 to enclose an internal cavity and to engage top edge 28 of outer wall 22.

As shown in the drawings, lid 26 is mounted on outer wall 22 with cooperative mounting means operative to support lid 26 on outer wall 22 for controlled movement of lid 26 relative top edge 28 from a closed position as shown in FIG. 1 to an open position as shown in FIG. 2. In the illustrated embodiment, such mounting is accomplished with a hinge bolt threaded through a pair of spaced apart hinge brackets 40 attached by welds to lid 26 and complementary hinge brackets 42 attached to outer wall 22. With such hinge mounting, lid may be swung, as indicated in FIG. 2 to an open position. In open position, it is desirable that lid 26 be swingable beyond its vertical position into engagement with a stop such as afforded by tab 44 on lid 26. To aid in the manipulation of lid 26, there may be provided a handle (not shown) which is secured to the lid by welds or the like.

Although any suitable form of quick-releasable fastening means may be employed for securing lid 26 in its closed position and exerting sealing pressure on combustible liner 20 as more particularly described below, a swing-bolt type of fastening means is particularly advantageous because of ease of operation and effectiveness of securing and clamping action. Hence in the embodiment illustrated, such fastening means are employed and comprise a T-bolt 46 pivotally carried in trunnions 48 (FIG. 7) welded to flange 38 and outer wall 22 above access opening 36. A free end of lid 26 overhangs flange 38 and includes an open slot 50 (FIG. 5) through which a threaded shank 52 of T-bolt 46 may be passed between engaged and free position. A handwheel 54 threadedly engages shank 52 and when screwed down tight against lid 26 holds the lid in tight closed position against combustible liner 20 and top edge 28 of outer wall 22. Other swing-bolts may also be used. For example, the cross-member of T-bolt may be replaced with a trunnion rod and shank 52 may be threaded into the trunnion rod with handwheel 54 to exert sealing pressure on the mating surfaces. In the first instance described above, handwheel 54 serves as a nut and in the second instance handwheel functions as the head of the bolt with the trunnion rod being the nut. It will further be apparent that various numbers or sizes, or both, of swing-bolts may be employed.

Figures 4, 5:
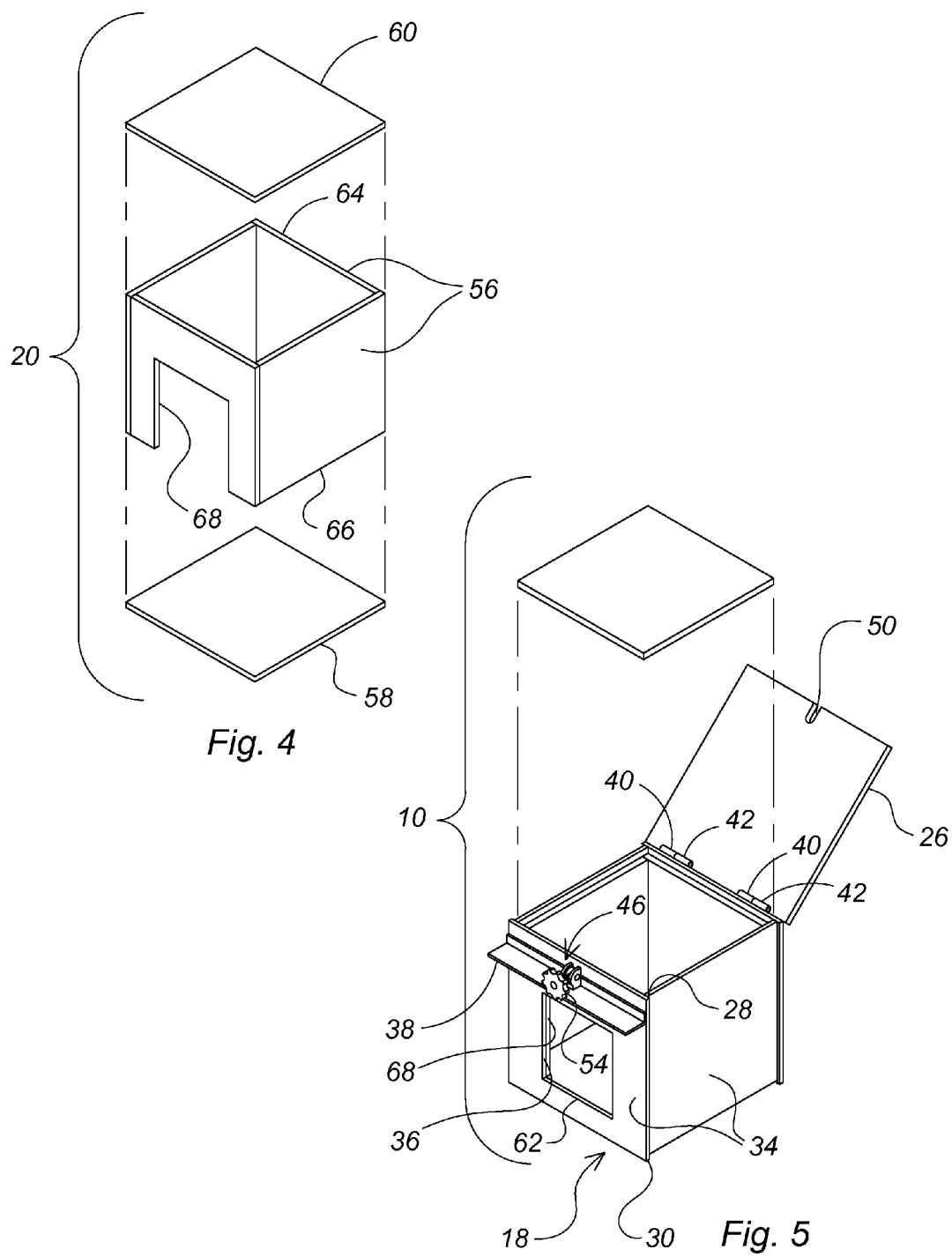
FIG. 4 is a exploded perspective view of the combustible liner.
FIG. 5 is a partially exploded perspective view of the metal container and combustible liner.
Figure 6:
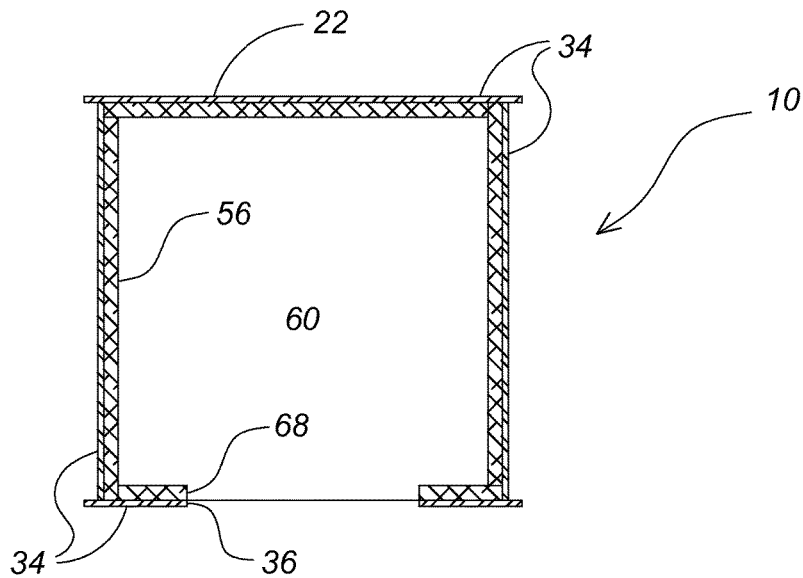
FIG. 6 is a cross-section taken along the plane of 6-6 in FIG. 5.

Combustible liner 20 as best seen in FIG. 4 has a plurality of side panels 56, a bottom panel 58 and a top panel 60; formed of particle board or other similar combustible material and the parts fitted together. Bottom panel 58 is sized such that it fits inside outer wall 22 and rests on bottom wall 24 of metal container 18 with its top surface elevated slightly above a threshold 62 of access opening 36 as shown in FIG. 7 such that it is easy to remove the panel if desired. Side panels 56 have an upper edge 64 and a lower edge 66 with lower edge 66 resting on bottom panel 58. In the form illustrated, metal container 12 is cuboidal and there are four equal sized side panels 56 but it will be understood that outer wall 22 of metal container 18 may be five-sided, etc. which determines the shape and size of side panels 56, bottom panel 58 and top panel 60 which line the inside of the container. While the panels could be lap joined or jointed with a biscuit, glued or stapled as are prior art "dolls house" equipment, in the form illustrated the panels are loosely butt jointed as there is no incentive or need to make the liner air tight. With continuing reference to FIG. 4, one of side panels 56 has an opening 68 which as shown in FIG. 5 is in registry with access opening 36 in outer wall 22 of metal container 18.

Upper edges 64 of side panels 56 are shorter than outer wall 22 such that when top panel 60 is placed on top of side panels 56, a top surface of top panel 60 is proud of top edge 28 of outer wall 22 as shown in FIG. 7. When lid 26 is closed over outer wall 22 and swing-bolt tightened, top panel 60 of combustible liner is compressed and forms a gasket blocking the passage of air into the combustible liner other than through access opening 36 in outer wall 22.

Portable unit as shown in the drawings is generally cuboidal and is about 16 inches width, depth and height. Outer wall 22 and bottom wall 24 are formed of ¼ inch steel and lid 26 of ½ inch steel. It will be understood, however, that metal container 18 may be smaller or made larger of different thickness of metal and still be portable depending on the thickness of the sheet metal used.

In use, unit 10 on mobilizer carriage 14 may be wheeled to a demonstration area. If not previously lined with combustible material, swing-bolt 46 is loosened by handwheel 54 until shank 52 clears slot 50 and allows lid 26 to be swung open on its hinges until stopped by tab 44. Standing in front of metal container 18, bottom panel 58 is placed on bottom wall 24 with the rough side of the wood up and the smooth side facing down. The rear side panel 56 is then inserted against the back outer wall 22 with the rough side of the wood facing the interior of the box. The rear side panel may then be side over to the left side creating a gap the thickness of the material out of which the panels are made. The right side panel is then inserted with one end in the gap left by the back panel and creating a gap of similar size at the front of metal container 18. The left side panel is then inserted with one end butted against the back panel and the opposite end against the front outer wall 22 of the metal container. The front panel section is then inserted filling the gap created at the front right side panel. Top panel 60 is then placed on top of side panels 56 with the rough side of the panel facing the interior of the metal box as with all panels. Lid 26 is then closed, swing-bolt 46 pivoted such that shank 52 passed through slot 50 and then handwheel 54 is used to compress top panel 60 forming an air seal.

Depending on the fire and smoke behavior to be illustrated in the training session, the box is loaded with sticks of wood 70 which may be cut from the same material used for combustible liner 20. For the majority of uses, 5 pieces of 12½ inch wood sections and 5 pieces of 8.5 inch pieces are sufficient. Before the wood is ignited, it should be stood vertically in the left or right corner of the box with enough space between the walls to assure air will feed the fire.

As shown in FIGS. 8A-8D, students are able to observe the various phenomena associated with a developing fire. In the early stages of fire growth, the unburned products of combustion (smoke and carbon particulates) streaming out of access opening 36 (see FIG. 8B) may be ignited to demonstrate their flammability. Unit 10 may also be used by an instructor during the development of the fire to simulate various hose stream techniques using small spray bottles filled with water mounted in a support 72 provided on mast 12 which may be coupled with a second support 73 for sticks of wood 70. Unit 10 may also be provided with secondary access openings 74, 76 (FIG. 1) with removable covers to simulate a broken window or a vent hole in the roof for the purpose of demonstrating the effect of various air flow patterns on the development of the fire.

Figures 8A, 8B, 8C, 8D:
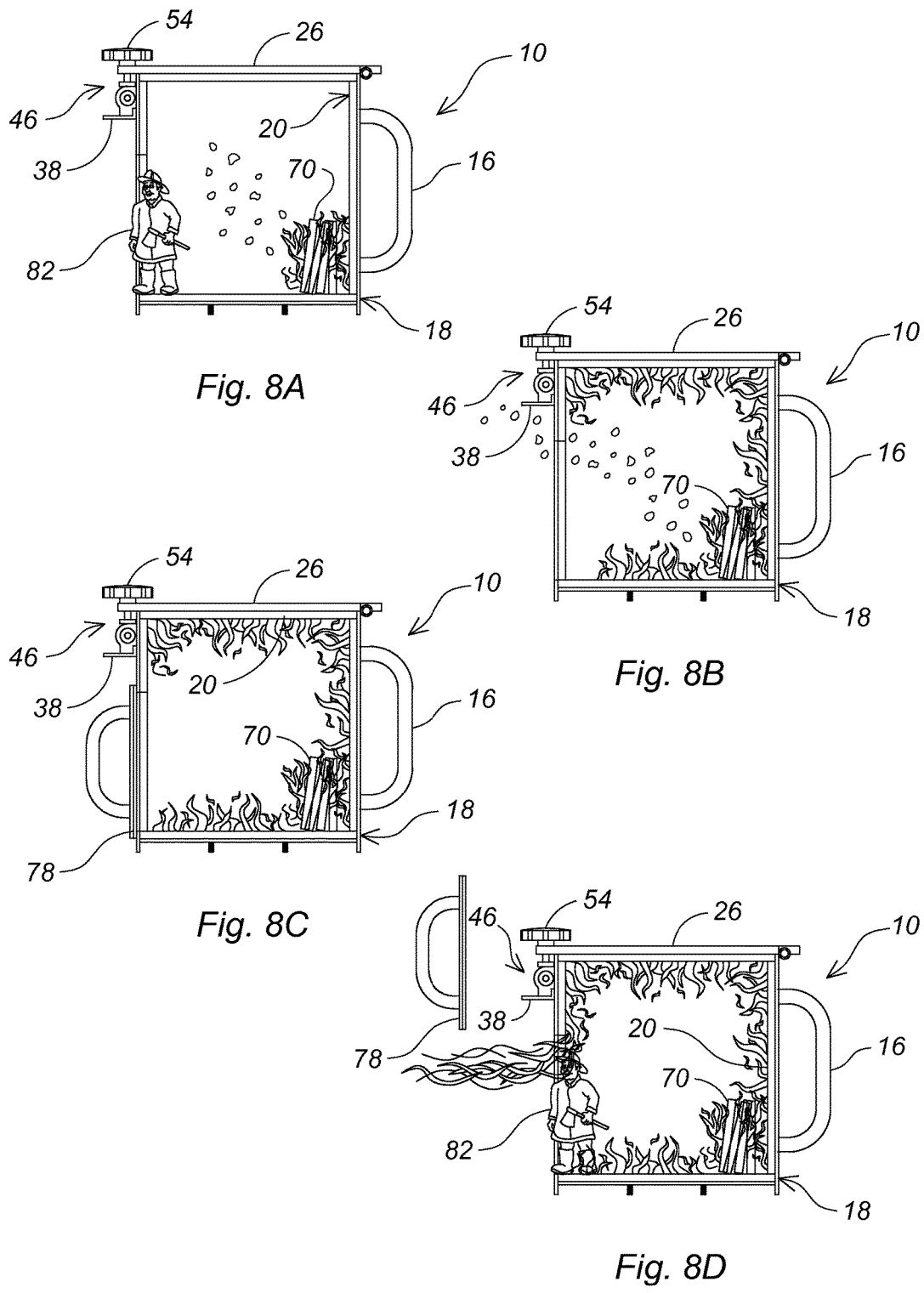

As the session progresses, the firefighters may observe the fire flashing over as shown in FIG. 8C to become a fully developed fire. The instructor may then demonstrate a backdraft by covering access opening 36 with a cover 78 stored on mast 12 in a bracket 80 (FIG. 1). When cover 78 is removed, fresh air flows into unit 10 which in ordinary course results in a fireball shooting out of access opening 36 with a 'whoooompf' or a 'bang' as the fire gases burn off in a plentiful supply of oxygen as shown in FIG. 8D. The demonstration is dramatic and for the firefighters being trained, unit 10 is the closest that they will ever want to be to a backdraft. A plastic firefighter 82 may be used in unit 10 to further demonstrate the dangers.

Unit 10 provides a controlled, interactive learning environment in which firefighters may observe and be trained in the following fire and smoke behavior terms: rollover/flameover, flashover, backdraft, smoke explosions, volume, velocity, density and color of smoke, thermal layering, flammable limits, door control, flow path, the fire behavior curve, ignition temperature and pyrolysis. These are just a few of the over 40 key fire service definitions that the firefighters will be able to witness during a live burn.

Since unit 10 is portable and relatively inexpensive to make, unit 10 allows fire fighting training effectively to be brought into the field without limitation by cost, time and/or logistics.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

What is claimed:

1. A portable firefighting training unit comprising a metal container with a combustible liner, said metal container having an outer wall, a bottom wall and a lid, said outer wall having a top edge and a bottom edge, said bottom wall joined to the outer wall near the bottom edge of the outer wall to define an open cavity, said outer wall having an access opening adjacent the bottom wall and a peripheral flange above the access opening below the top edge, said lid hinged to the outer wall opposite the access opening for movement relative to the top edge of outer wall between a closed and an open position, said lid further having a swing bolt carried in trunnions attached to the flange and to the outer wall above the access opening, said swing bolt having a threaded shank with a handwheel threadedly engaging the shank, said lid having an open slot through which the shank of the swing bolt may be passed for securing the lid in the closed position when the handwheel is screwed down against the lid, a cover for blocking an air pathway through the access opening; and, said combustible liner having a plurality of side panels, a bottom panel and a top panel, said bottom panel fitted inside the outer wall of the metal container and resting on the bottom wall of the metal container, said side panels having an upper edge and a lower edge, said lower edge of the side panels resting on the bottom panel, said side panels butted together against the outer wall of the metal container, one of said side panels having an opening in registry with the access opening in the outer wall of the metal container, said top panel resting on the upper edge of the side panels with a top surface of the top panel proud of the top edge of the outer wall, whereby the air pathway to the combustible liner is substantially blocked other than through the access opening in the outer wall of the metal container when the lid is in the closed position and the handwheel is screwed down against the lid with the lid exerting a sealing pressure on the top panel.

2. The unit of claim 1 wherein the metal container is mounted on a mast supported on a mobilizer carriage.

3. The unit of claim 1 wherein the swing bolt is T-bolt with a head journaled in the trunnions.

4. The unit of claim 1 wherein the shank of the swing bolt is threaded into a trunnion rod journaled in the trunnions.

5. The unit of claim 1 wherein the outer wall, bottom wall and lid of the metal container are formed of sheet steel and the panels of the combustible liner are formed of particle board.

6. The unit of claim 1 wherein the metal container is cuboidal and is about 16 inches in width, depth and height.

7. The unit of claim 1 further comprising a second access opening simulating a roof vent.

8. The unit of claim 1 further comprising a second access opening simulating a window.

9. A portable firefighting training unit comprising a metal container with a combustible liner and a removable cover, said metal container having an outer wall, a bottom wall and a lid, said outer wall having a top edge and a bottom edge, said bottom edge joined to the bottom wall to define an open cavity, said outer wall having an access opening along the bottom wall and a peripheral flange above the access opening and below the top edge, said lid having cooperative mounting means operative to support the lid on the outer wall for controlled movement relative to the top edge of the outer wall between a closed and an open position, said lid further having a quick-releasable fastening means for securing the lid in the closed position;

said combustible liner having a plurality of side panels, a bottom panel and a top panel, said bottom panel fitted inside the outer wall of the metal container and resting on the bottom wall of the metal container, said side panels having an upper edge and a lower edge, said lower edge of the side panels resting on the bottom panel, said side panels butted together against the outer wall of the metal container, one of said side panels having an opening in registry with the access opening in the outer wall of the metal container, said top panel resting on the upper edge of the side panels with a top surface of the top panel proud of the top edge of the outer wall; and, said cover removably blocking an air pathway through the access opening whereby the air pathway to the combustible liner is blocked other than through the access opening in the outer wall of the metal container when the lid is in the closed position and with the lid exerting a sealing pressure on the top panel.

10. The unit of claim 9 wherein the outer wall, bottom wall and lid of the metal container are formed of sheet steel and the panels of the combustible liner are formed of particle board.

11. The unit of claim 10 wherein the metal container is mounted on a mast on a mobilizer carrier and said cover is attached to the mast with a bracket.

12. The unit of claim 11 wherein a first support is provided on the mast for a spray bottle.

13. The unit of claim 12 wherein a second support is provided on the mast for sticks of combustible material.

* * * * *